United States Patent
Gopalakrishnan et al.

(10) Patent No.: US 12,353,486 B2
(45) Date of Patent: Jul. 8, 2025

(54) GENERATING ENHANCED QUERIES USING MACHINE LEARNING MODELS

(71) Applicant: Oracle International Corporation, Redwood Shores, CA (US)

(72) Inventors: Venkatakrishnan Gopalakrishnan, Seattle, WA (US); May Bich Nhi Lam, San Jose, CA (US); Diego Ceferino Torres Dho, Barcelona (ES); Jan Sterba, Bratislava (SK)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/467,360

(22) Filed: Sep. 14, 2023

(65) Prior Publication Data

US 2025/0094504 A1    Mar. 20, 2025

(51) Int. Cl.
*G06F 16/334*    (2025.01)
*G06F 16/93*    (2019.01)
(Continued)

(52) U.S. Cl.
CPC ...... *G06F 16/9532* (2019.01); *G06F 16/3347* (2019.01); *G06F 16/93* (2019.01); *G06N 20/00* (2019.01)

(58) Field of Classification Search
CPC ... G06F 16/3347; G06F 16/93; G06F 16/9532
See application file for complete search history.

(56) References Cited

U.S. PATENT DOCUMENTS 8,364,528 B2    1/2013  Selinger et al.
10,699,321 B2   6/2020  Krishnamurthy et al.
(Continued)

FOREIGN PATENT DOCUMENTS

JP   2016-091535 A      5/2016
WO   WO-9708604 A2 *    3/1997  ........ G06F 17/30011

OTHER PUBLICATIONS

Ajibola et al., "A Domain-Specific Search Engine: A Case of University of Abuja", International Journal of Advances in Scientific Research and Engineering (ijasre), Dec. 2019, vol. 5, No. 12, pp. 122-131.
(Continued)

*Primary Examiner* — Robert W Beausoliel, Jr.
*Assistant Examiner* — Nirav K Khakhar
(74) *Attorney, Agent, or Firm* — Invoke

(57) ABSTRACT

Techniques for generating terms to replace an initial set of search terms for a query are disclosed. A system generates a training data set for training a machine learning model. Generating the training data set includes generating search value vectors for each of a set of labels based on sets of search values associated respectively with the labels in the set of labels. The system trains a machine learning model to predict a target label for a target search vector based on the set of labels and the respectively associated search value vectors. The system generates a target search value vector based on an initial set of search values. The system then applies the trained machine learning model to the target search value vector to predict the target label. The target label is used as a search term, that replaces the initial set of search values, for executing the query.

24 Claims, 10 Drawing Sheets

(51) Int. Cl.
  *G06F 16/9532* (2019.01)
  *G06N 20/00* (2019.01)

(56) References Cited

U.S. PATENT DOCUMENTS

| | | | |
|---|---|---|---|
| 2016/0224662 | A1 | 8/2016 | King et al. |
| 2017/0148083 | A1 | 5/2017 | Yu |
| 2020/0364233 | A1 | 11/2020 | Chan |
| 2022/0180059 | A1* | 6/2022 | Lee .................. G06F 40/30 |

OTHER PUBLICATIONS

Dagale et al., "Dynamic Document Annotation for Efficient Data Retrieval", International Journal on Recent and Innovation Trends in Computing and Communication, vol. 4, No. 12, Dec. 2016, pp. 139-145.

Fautsch et al., "Adapting the tf idf vector-space model to domain specific information retrieval", Mar. 2010, pp. 6.

Hamzaoui O., "Novartis AG uses Amazon OpenSearch Service K-Nearest Neighbor (KNN) and Amazon SageMaker to power search and recommendation (Part 3/4)", Retrieved from https://aws.amazon.com/blogs/industries/novartis-ag-uses-amazon-elasticsearch-k-nearest-neighbor-knn-and-amazon-sagemaker-to-power-search-and-recommendation/, Dec. 14, 2020, pp. 1-16.

Pandiarajan S. et al., "Semantic Search Engine Using Natural Language Processing", Advanced Computer and Communication Engineering Technology, Lecture Notes in Electrical Engineering, vol. 315, Nov. 2015, pp. 561-571.

Prasanna et al., "Document Classification Using KNN with Fuzzy Bags of Word Representation", International Journal of Recent Technology and Engineering (IJRTE), vol. 7, No. 6S, Mar. 2019, pp. 631-634.

Trstenjak et al., "KNN with TF-IDF Based Framework for Text Categorization", 24th DAAAM International Procedia Engineering, vol. 69, 2014, pp. 1356-1364.

Wani et al., "Legal Document Classification using TF-IDF and KNN", International Journal of Advanced Research in Science, Communication and Technology (IJARSCT), vol. 2, No. 1, Nov. 2022, pp. 590-595.

"Personalization through User Attributes for Transformer-based Sequential Recommendation", May 2022, pp. 1-12.

Alharthi H., "Natural Language Processing for Book Recommender Systems", 2019, pp. 179.

Bailing W. et al., "A Recommendation System Based on Regression Model of Three-Tier Network Architecture", International Journal of Distributed Sensor Networks vol. 12, No. 3, Mar. 2016, pp. 1-15.

Liu et al., "Collaborative Filtering Recommendation Algorithm Based on User Attributes and Item Score", Scientific Programming, vol. 2022, pp. 1-7.

Wayesa et al., "Pattern-based hybrid book recommendation system using semantic relationships", Sci Rep., vol. 13, Mar. 6, 2023, pp. 1-22.

Zainurrohman A., "Content-Based Recommender System Using NLP", Retrieved from https://medium.com/mlearning-ai/content-based-recommender-system-using-nlp-445ebb777c7a#:~:text=How%20do%20content%2Dbased%20recommender,is%20examining%20in%20the%20present, Feb. 27, 2021, pp. 1-17.

* cited by examiner

```
┌─────────────────────────────────────────────────────────────────┐
│ Preprocess the search values in each set of search values       │
│ associated with a label.                                        │
│                          202a                                    │
└─────────────────────────────────────────────────────────────────┘
                                 ▼
┌─────────────────────────────────────────────────────────────────┐
│ Aggregate the preprocessed sets of search values to generate    │
│ an entire dictionary vector for each label that includes        │
│ $n$ search values.                                              │
│                          202b                                    │
└─────────────────────────────────────────────────────────────────┘
                                 ▼
┌─────────────────────────────────────────────────────────────────┐
│ Create a search vector for each set of search values that       │
│ represents a location of each search value of the set of        │
│ search values within the entire dictionary vector for the       │
│ label associated with the set of search values.                 │
│                          202c                                    │
└─────────────────────────────────────────────────────────────────┘
                                 ▼
┌─────────────────────────────────────────────────────────────────┐
│ Determine a numerical representation (e.g., term frequency      │
│ $tf$) for each search value within its set of search values by  │
│ identifying the number of occurrences of each search value      │
│ within its set of search values.                                │
│                          202d                                    │
└─────────────────────────────────────────────────────────────────┘
                                 ▼
┌─────────────────────────────────────────────────────────────────┐
│ Determine a numerical representation (e.g., inverse document    │
│ frequency $idf$) for each search value of the set of search     │
│ values based on occurrence(s) of the search value in the        │
│ entire dictionary vector for each label.                        │
│                          202e                                    │
└─────────────────────────────────────────────────────────────────┘
                                 ▼
┌─────────────────────────────────────────────────────────────────┐
│ Determine a combined numerical representation for each search   │
│ value by combining the numerical representation for each        │
│ search value within its set of search values and the numerical  │
│ representation for occurance(s) of each search value within     │
│ the entire dictionary vector for each label.                    │
│                          202f                                    │
└─────────────────────────────────────────────────────────────────┘
                                 ▼
┌─────────────────────────────────────────────────────────────────┐
│ Update the search vector, generated in operation 202c, to       │
│ incorporate the combined numerical representations, for         │
│ search values, generated in operation 202f.                     │
│                          202g                                    │
└─────────────────────────────────────────────────────────────────┘
                                 ▼
┌─────────────────────────────────────────────────────────────────┐
│ Graph the updated search vector for each set of search values.  │
│                          202h                                    │
└─────────────────────────────────────────────────────────────────┘
```

FIG. 2B

User Prepared Training Dictionary

Tag, Keywords, LandingPage ID
cloud-ops, Cloud Operations; Cloud Ops; Help; netsuiteops, 384307526
infrastructure, infrastructure; infra, 380756075
trust-services, trust services, 360749975
nsit, nsit; nsit internal; nsit contact; nsit landing page; nsit ops; nsit confluence; nsit identity teams; oraclenetsuite nsit; netsuite it; netsuite, 370724273
jira, jira; ops jira; new jira project,

FIG. 3A

Expanded (Preprocessed) Training Dictionary

Tag, Keywords
cloud-ops, cloud-ops cloudops cloud operations ops help cloud-op cloudop oper op
infrastructure, infrastructure infra infrastructur
trust-services, trust-services trustservices trust services service trust-service trustservic servic
nsit, nsit
jira, jira access ops new project op

FIG. 3B

Raw Text Vectors cloud-ops [ cloud-ops cloudops cloud operations ops help cloud-op cloudop oper op ]

infrastructure [ infrastructure infra infrastructur ]

trust-services [ trust-services trustservices trust services service trust-service trustservic servic ]

nsit [ nsit ]

jira [ jira access ops new project op ]

FIG. 3C

Entire Dictionary Matrix:

cloud-ops [cloud-ops cloudops cloud operations ops help cloud-op cloudop oper op infrastructure infra infrastructur nsit trust-services trustservices trust services service trust-service trustservic servic jira access ops new project op]

infrastructure [cloud-ops cloudops cloud operations ops help cloud-op cloudop oper op infrastructure infra infrastructur nsit trust-services trustservices trust services service trust-service trustservic servic jira access ops new project op]

nsit [cloud-ops cloudops cloud operations ops help cloud-op cloudop oper op infrastructure infra infrastructur nsit trust-services trustservices trust services service trust-service trustservic servic jira access ops new project op]

trust-services [cloud-ops cloudops cloud operations ops help cloud-op cloudop oper op infrastructure infra infrastructur nsit trust-services trustservices trust services service trust-service trustservic servic jira access ops new project op]

jira [cloud-ops cloudops cloud operations ops help cloud-op cloudop oper op infrastructure infra infrastructur nsit trust-services trustservices trust services service trust-service trustservic servic jira access ops new project op]

FIG. 3D

Count Vectorizer Matrix cloud-ops [ 1, 1, 1, 1, 1, 1, 1, 1, 1, 1, 0, 0, 0, 0, 0, 0, 0, 0, 0, 0, 0, 0, 0, 0, 1, 0, 0, 1 ]

infrastructure [ 0, 0, 0, 0, 0, 0, 0, 0, 0, 0, 1, 1, 1, 0, 0, 0, 0, 0, 0, 0, 0, 0, 0, 0, 0, 0, 0 ]

nsit [ 0, 0, 0, 0, 0, 0, 0, 0, 0, 0, 0, 0, 1, 0, 0, 0, 0, 0, 0, 0, 0, 0, 0, 0, 0, 0, 0 ]

trust-services [ 0, 0, 0, 0, 0, 0, 0, 0, 0, 0, 0, 0, 0, 1, 1, 1, 1, 1, 1, 1, 1, 0, 0, 0, 0, 0, 0 ]

jira [ 0, 0, 0, 0, 1, 0, 0, 0, 0, 1, 0, 0, 0, 0, 0, 0, 0, 0, 0, 0, 0, 1, 1, 1, 1, 1, 1 ]

FIG. 3E tf and idf Values cloud-ops: tf - 1/10; idf - 1/5
cloudops: tf - 1/10; idf - 1/5
cloud: tf - 1/10; idf - 1/5
operations: tf - 1/10; idf - 1/5
ops: tf - 1/10; idf - 2/5
help: tf - 1/10; idf - 1/5
cloud-op: tf - 1/10; idf - 1/5
cloudop: tf - 1/10; idf - 1/5
oper: tf - 1/10; idf - 1/5
op: tf - 1/10; idf - 2/5 infrastructure: tf - 1/3; idf - 1/5
infra: tf - 1/3; idf - 1/5
infrastructur: tf - 1/3; idf - 1/5 nsit: tf - 1/1; idf - 1/5 trust-services: tf - 1/8; idf - 1/5
trustservices: tf - 1/8; idf - 1/5
trust: tf - 1/8; idf - 1/5
services: tf - 1/8; idf - 1/5
service: tf - 1/8; idf - 1/5
trust-service: tf - 1/8; idf - 1/5
trustservic: tf - 1/8; idf - 1/5
servic: tf - 1/8; idf - 1/5 jira: tf - 1/6; idf - 1/5
access: tf - 1/6; idf - 1/5
ops: tf - 1/6; idf - 2/5
new: tf - 1/6; idf - 1/5
project: tf - 1/6; idf - 1/5
op: tf - 1/6; idf - 2/5

FIG. 3F

Updated Matrix cloud-ops [ 0.2, 0.2, 0.2, 0.2, 0.4, 0.2, 0.2, 0.2, 0.2, 0.4, 0, 0, 0, 0, 0, 0, 0, 0, 0, 0, 0, 0, 0, 0.2, 0, 0, 0.4 ]
infrastructure [ 0, 0, 0, 0, 0, 0, 0, 0, 0, 0, 0.6, 0.6, 0.6, 0, 0, 0, 0, 0, 0, 0, 0, 0, 0, 0, 0, 0, 0 ]
nsit [ 0, 0, 0, 0, 0, 0, 0, 0, 0, 0, 0, 0, 0, 0.9, 0, 0, 0, 0, 0, 0, 0, 0, 0, 0, 0, 0, 0 ]
trust-services [ 0, 0, 0, 0, 0, 0, 0, 0, 0, 0, 0, 0, 0, 0.2, 0.2, 0.2, 0.2, 0.2, 0.2, 0.2, 0.2, 0, 0, 0, 0, 0, 0 ]
jira [ 0, 0, 0, 0, 0.6, 0, 0, 0, 0, 0.6, 0, 0, 0, 0, 0, 0, 0, 0, 0, 0, 0, 0.3, 0.3, 0.6, 0.3, 0.3, 0.6 ]

FIG. 3G

Target Search Value

Search Value: "oper"

Count Vectorizer Vector

Oper: [ 0, 0, 0, 0, 0, 0, 0, 0, 1, 0, 0, 0, 0, 0, 0, 0, 0, 0, 0, 0, 0, 0, 0, 0, 0, 0, 0 ]

***tf-idf* Transformer**

Oper: tf - 1/1; idf - 1/5

Target Search Vector

Oper: [ 0, 0, 0, 0, 0, 0, 0, 0, 0.2, 0, 0, 0, 0, 0, 0, 0, 0, 0, 0, 0, 0, 0, 0, 0, 0, 0, 0 ]

KNN cloud-ops [ 0.2, 0.2, 0.2, 0.2, 0.4, 0.2, 0.2, 0.2, 0.2, 0.2, 0, 0, 0, 0, 0, 0, 0, 0, 0, 0, 0, 0, 0, 0.2, 0, 0, 0.4 ]

FIG. 4

SmartSearch Logs
Displaying 3 logs, newest on top.
Stats: 3 Daily logs. 3 Staging + Daily logs.
Download CSV file: Daily logs only or Staging + Daily log                                    A |

| Timestamp | User ID | User Keyword | ML Model Identified Label | ML Keyphrase |
|---|---|---|---|---|
| 07/08/2023 16:09:08 | user1@abc.com | trust services | trust-services | trust services |
| 07/06/2023 15:04:82 | user2@abc.com | cloud operations | cloud-ops | cloud operations |
| 07/06/2023 14:59:57 | user1@abc.com | rugby | NO_MATCHES_FOUND | rugby |
| 07/05/2023 12:34:16 | user1@abc.com | things you should know | learning-career-development | things know |

| A | | |
|---|---|---|
| ML Model Identified Page ID | Confluence CQL String | No. of Results |
| 360749975 | 1st: ID in (360749975) 2nd: ((Label = "trust-services" OR Title ~ "trust-services") OR (Label = "trust-services" OR Title ~ "trust services")) AND (type IN (space, page, blogpost, user)) AND ID NOT in (360749975) AND Lastmodified > now("-24M") 3rd: (Text ~ "trust services" OR Text ~ "trust-services" OR Text ~ "trust services") AND ID NOT in (360749975) AND type NOT IN (attachment, comment) | 51 |
| 384307526 | 1st: ID in (384307526) 2nd: ((Label = "cloud-ops" OR Title ~ "cloud-ops") OR (Label = "cloud-operations" OR Title ~ "cloud operations")) AND (type IN (space, page, blogpost, user)) AND ID NOT in (384307526) AND Lastmodified > now("-24M") 3rd: (Text ~ "cloud operations" OR Text ~ "cloud ops" OR Text ~ "cloud operations") AND ID NOT in (384307526) AND type NOT IN (attachment, comment) | 51 |
| NO_MATCHES_FOUND | 1st: ((Label = "rugby" OR Title ~ "rugby") AND (type IN (space, page, blogpost, user)) AND ID NOT in (0) AND Lastmodified > now("-24M") 2nd: (Text ~ "rugby" OR Text ~ "rugby") AND ID NOT in (0) AND type NOT IN (attachment, comment) | 29 |
| 393638509 | 1st: ID in (393638509) 2nd: ((Label = "learning-career development" OR Title ~ "learning-career-development") OR (Label = "things-know" OR Title ~ "things know")) AND (type IN (space, page, blogpost, user)) AND ID NOT in (393638509) AND Lastmodified > now("-24M") 3rd: (Text ~ "things you should know" OR Text ~ "learning-career-development" OR Text ~ "things know") AND ID NOT in (393638509) AND type NOT IN (attachment, comment) | 31 |

| A (Continued from FIG. 5A)

FIG. 5B

GENERATING ENHANCED QUERIES USING MACHINE LEARNING MODELS

TECHNICAL FIELD

The present disclosure relates to searching for documents in a documentation repository using keyword search queries. In particular, the present disclosure relates to using machine learning models to predict a target label from the keyword search queries for enhancing search results.

BACKGROUND

Documentation repositories play a crucial role in software development, project management, and knowledge management by providing a structured and collaborative environment for creating, updating, sharing, and tracking documentation. Search engines for identifying documents or pages within the documentation repositories typically support free text or heuristic searching by indexing content of the documents in the repository. At search time, keywords are extracted from the user query to match with the index information in a string level match. The search results often return documents that are not relevant to the search query.

Tags or labels, including metadata of the documents, such as theme, type, owner, and other related topics, may be applied to the documents to assist in identifying more relevant documents. However, unless users are familiar with the tagging convention used with the documents, the match between the search query and the metadata may still return poor results.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 2B illustrates an example set of operations for generating search value vectors in accordance with one or more embodiments;

FIGS. 3A-3G illustrate an example of training a machine learning model for predicting a target label for use in an enhanced search query;

FIG. 4 illustrates an example of the trained machine learning model of FIGS. 3A-3G applied to a keyword search to determine a target label;

FIGS. 5A and 5B are an example search log generated by a search engine in accordance with one or more embodiments.

DETAILED DESCRIPTION

Figure 1:
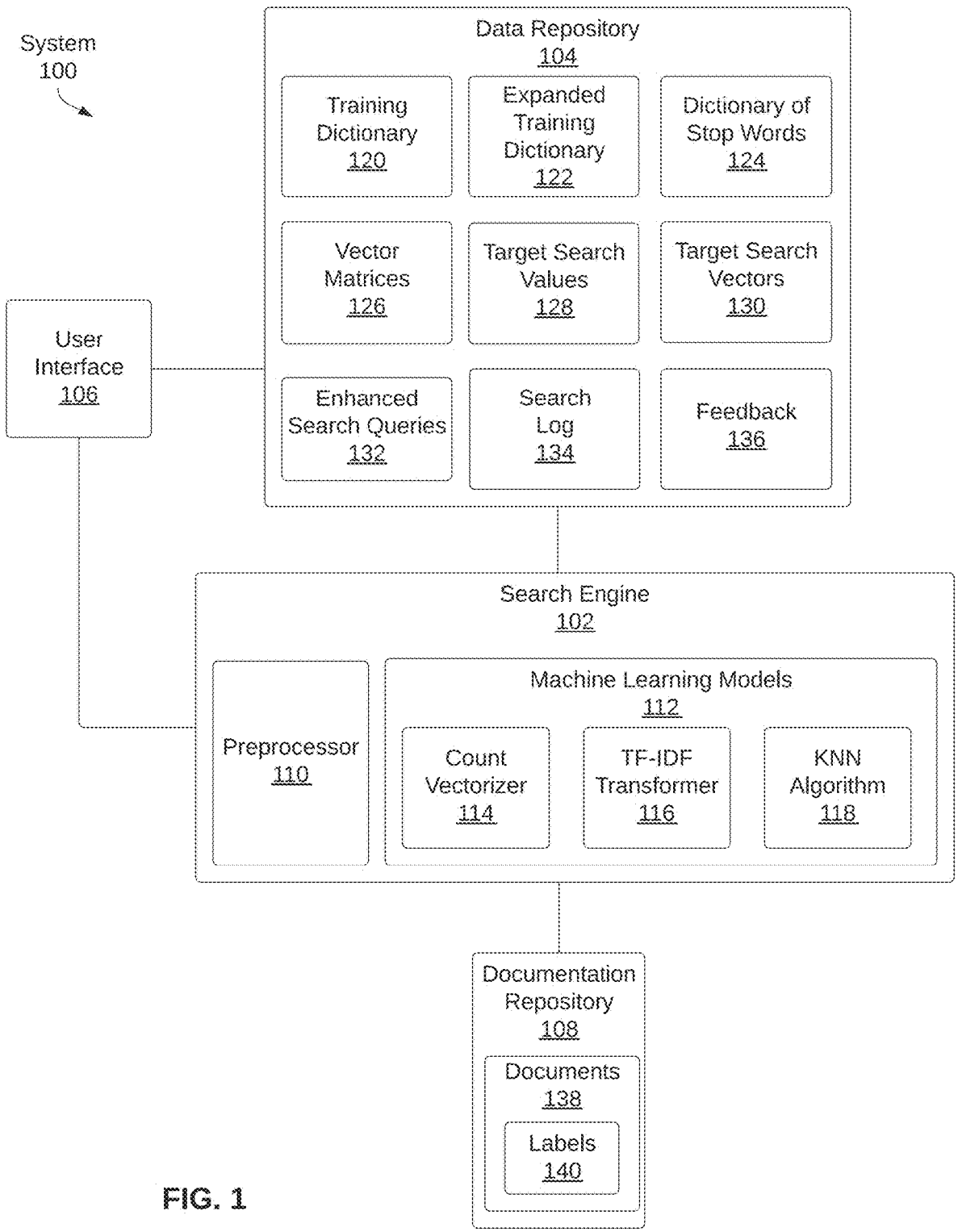
FIG. 1 illustrates a system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SEARCH ENGINE SYSTEM ARCHITECTURE
3. GENERATING ENHANCED SEARCH QUERY
4. GENERATING SEARCH VALUE VECTORS
5. EXAMPLE TRAINING OF MACHINE LEARNING MODEL
6. EXAMPLE USE OF TRAINED MACHINE LEARNING MODEL
7. EXAMPLE SEARCH LOG FOR TRAINED MACHINE LEARNING MODEL
8. HARDWARE OVERVIEW
9. MISCELLANEOUS; EXTENSIONS

1. General Overview

One or more embodiments use machine learning to generate a term(s) to replace or augment an initial set of search terms corresponding to a query. The term(s) that replaces or augments the initial set of search terms is referred to herein as a target label. Executing the query with the target label as a search term may result in generation of results that are more relevant than results would be generated by executing the query using the initial set of search terms.

Initially, a system generates a training data set for training a machine learning model. Generating the training data set includes generating search value vectors for each of a set of labels based on sets of search values associated respectively with the labels in the set of labels. The system trains a machine learning model to predict a target label for a target search vector based on the set of labels and the respectively associated search value vectors. When the system receives a query with an initial set of search values, the system generates a target search value vector based on the initial set of search values. The system then applies the trained machine learning model to the target search value vector to predict the target label. The target label is used as a search term, that replaces or augments the initial set of search values, for execution of the query.

In one or more embodiments, the training data set, including the search value vectors, is generated by extracting and using characteristics of sets of search values that are associated respectively with a set of labels. Initially, a system preprocesses and aggregates the sets of search values to generate a dictionary of search values. Furthermore, the system generates a search vector for each set of search values. The search vector, for each set of search values, represents a location of the set of search values within the dictionary of values. The system then updates the search vector, representing the location of the set of search values, to also represent additional information corresponding the set of search values. The additional information includes a term frequency tf that is indicative of the number of terms in the set of search values. The additional information further includes an inverse document frequency idf that is indicative of a number of occurrences of the search values, from the set of search values, in the dictionary of values.

One or more embodiments receive feedback associated with a prediction by the machine learning model and retrain the machine learning model based on the feedback.

One or more embodiments described in this Specification and/or recited in the claims may not be included in this General Overview section.

2. Search Engine System Overview

FIG. 1 illustrates a system 100 in accordance with one or more embodiments. As illustrated in FIG. 1, the system 100 includes a search engine 102, a data repository 104, a user interface 106, and a documentation repository 108. In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

In one or more embodiments, the search engine 102 refers to hardware and/or software configured to perform operations described herein for providing an enhanced search query. Examples of operations for providing an enhanced search query are described below with reference to FIGS. 2A and 2B.

In one or more embodiments, the search engine 102 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware network address translator (NAT), a hardware load balancer, a mainframe, a television, a content receiver, a set-top box, a printer, a mobile handset, a smartphone, a personal digital assistant (PDA), a wireless receiver and/or transmitter, a base station, a communication management device, a router, a switch, a controller, an access point, and/or a client device.

In one or embodiments, operation of the search engine 102 includes a training phase and an inference phase. In embodiments, during the training phase, the search engine 102 receives a training dictionary or index of key value pairs 120. In embodiments, the key value pairs include a label for each document in the documentation repository 108, and a set of one or more possible search values corresponding to each of the labels. In embodiments, the search engine 102 includes a preprocessor 110 for transforming the sets of one or more possible search values into usable text for processing by one or more machine learning models 112. In some embodiments, the result of the processing by the one or more machine learning models 112 is a matrix of vectors corresponding to the labels from the training dictionary 120.

In one or more embodiments, during the inference phase, the search engine 102 receives a user search query including a target set of one or more target search values 128. In embodiments, the search engine 102 preprocesses the one or more search values to prepare the target set of one or more target search values 128 for processing by the one or more machine learning models 112. The one or more machine learning models 112 generate a target search vector 130 for the target set of one or more target search values 128. The search engine 102 compares the target search vector 130 for the target set of one or more target search values 128 to the search value vectors corresponding to the labels from the training dictionary 120 to identify the closest or most similar search value vector to the target search vector 130. The label associated with the closest search value vector is predicted as the target label for the target set of one or more target search values 128.

In one or more embodiments, the preprocessor 110 of the search engine 102 is a software tool or component that performs various transformations on the search values in the training dictionary 120. The preprocessor 110 performs some processes on the search values individually, and other processes on the sets of one or more search values associated with each label. The preprocessor 110 prepares the search values in the training dictionary 120 for use by the one or more machine learning models 112. The preprocessor 110 may generate an expanded training dictionary by (a) deleting duplicate words within each set of search values, (b) converting the possible search values to lowercase, (c) cleaning up special characters from the possible search values, (d) removing stop words from the possible search values, (e) lemmatizing the possible search values and/or (f) stemming the possible search values.

In one or more embodiments, converting possible search values to lowercase letters ensures uniformity and consistency. Some embodiments convert all words to lowercase to assist in normalizing the text by eliminating the distinction between search values that are capitalized and search values that are not capitalized. Capitalization variations can lead to inconsistency when comparing, searching, or processing text. The search values may be converted to lowercase letters to ensure that the same search value in different forms, e.g., "Apple," "apple," and "APPLE", is treated as the same search value. In some embodiments, where capitalization is used for emphasis or to convey additional information, lowercasing removes this noise.

In one or more embodiments, cleaning up special characters from the possible search values includes addressing special characters, symbols, punctuation, and other non-alphanumeric characters. The non-alphanumeric characters may not always carry meaningful information and can potentially interfere with modeling. Special characters may be cleaned up by removing punctuation marks, such as commas, periods, question marks, and exclamation points. Special characters may be cleaned up by replacing contractions to assist in maintaining the integrity of the possible search values during analysis, e.g., expand contractions like "don't" to "do not" and "it's" to "it is." Some embodiments remove non-alphanumeric characters that are neither letters nor numbers, including, symbols, emojis, and other non-ASCII characters. Some embodiments normalize accents and diacritics by converting accented characters and diacritics to their base form, e.g., "résumé" is normalized to "resume." Some embodiments replace special characters with spaces, e.g., replace special characters with spaces or other placeholders, to separate search values that may have been concatenated with special characters. Some embodiments normalize Unicode characters to a standard form to handle different character representations. Regular expressions may be used to match and replace specific patterns of special characters. Some embodiments include custom cleaning rules to address specific special character patterns.

One or more embodiments delete duplicate search values within a set of search values for each label. In embodiments, removing duplicate words prevents distortion of search value frequency calculations. In some embodiments, possible search values appear in more than one label. As will be described in further detail below, the appearance of the same search value in more than one label affects the inverse document frequency (idf) value of the search value.

In one or more embodiments, stop words are common words that are considered to be of little value in terms of conveying meaningful information and are filtered out to improve the efficiency and effectiveness of the machine learning models 112. Stop words are generally common words that appear frequently across different documents or texts, and may not carry significant semantic meaning on their own. Examples of stop words in English include words like "the", "and", "is", "of", "in", "to", "it", and "that". In some embodiments, a dictionary of stop words 124 is maintained in the data repository 104 for use by the search engine 102.

One or more embodiments utilize lemmatization, a normalization technique, to reduce the search values to their base or dictionary form, known as a "lemma." The lemma represents the canonical, or base, form of a word, and lemmatization includes removing inflections and variations to convert search values to their common root form. Lemmatization groups together different inflected forms of a search value so that the search values can be analyzed as a single item. Lemmatization assists in improving the accuracy and efficiency of text analysis tasks by reducing the number of unique search values while preserving the core meaning of the text. For example, the lemma of the words "running," "runs," and "ran" is "run." Similarly, "better" and "best" have the lemma "good." The aim of lemmatization is to preserve the contextual meaning of words. In some embodiments, lemmatization accounts for the part of speech (POS) of the search value. For example, the lemma of "better" as an adjective would be "good," while its lemma as a verb might be "better." One or more embodiments rely on linguistic databases (lexicons) and morphological rules to determine the correct lemma for a given word and its context. Libraries such as Natural Language Toolkit (NLTK) and spaCy may be used to provide lemmatization capabilities for various languages. In embodiments, lemmatization enhances the accuracy of text analysis tasks by reducing word variations.

One or more embodiment use stemming, a text normalization technique, to reduce the search values to their base or root form, known as a "stem". The stem represents the core part of a search value to which prefixes and suffixes are removed. Stemming simplifies search values to their common base form, allowing search values with similar meanings to be treated as the same word. For example, the stem of the words "running," "runs," and "ran" is "run." Similarly, "jumping," "jumps," and "jumped" have the stem "jump." Stemming is computationally less intensive than other text normalization techniques like lemmatization. Stemming algorithms are available for different languages and are implemented in various NLP libraries. The Porter stemming algorithm and the Snowball stemmer are used for English stemming.

In one or more embodiments, the machine learning models 112 are mathematical representation or algorithmic structure that learn patterns, relationships, or behaviors from the expanded training dictionary 122 and determine the target label for a target search value based on that learned knowledge.

In one or more embodiments, the machine learning models 112 are trained during the training phase and the trained models are applied during the inference phase. In the training phase, the machine learning models 112 generate a matrix of search value vectors from the expanded training dictionary 122, and in the inference phase, the machine learning models 112 use the matrix of search value vectors to make a prediction of a target label for a target search value 128. In embodiments, similar to the process performed during the training phase, during the inference phase, the machine learning models 112 are applied to the target search value(s) to generate a target search vector 130. The machine learning models 112 use the learned patterns and relationships from the matrix of search value vectors to predict a target label for the target search values 128.

In embodiments, the machine learning models 112 include a count vectorizer 114 for converting a search value vector into a numerical vector, a tf-idf transformer for providing an updated numerical representation of the search values in the count vector, and a KNN algorithm 118 for determining a closest neighbor to the target search vector 130.

In one or more embodiments, the count vectorizer 114 of the machine learning models 112 transforms the matrix of raw text, e.g., entire dictionary matrix, into a matrix of numeric vectors, e.g., search value vectors, each search value vector being associated with a label. In embodiments, the count vectorizer 114 prepares the raw text data for further processing by other algorithms of the machine learning models 112.

In one or more embodiments, the count vectorizer 114 creates a vector for each set of one or more search values associated with the labels by generating a raw text vector for each of one or more search values in the expanded training dictionary 122 associated with each of the labels and aggregating all the search values in the raw text vector for each of the labels into an entire dictionary vector. In some embodiments, the order of the search values in the entire dictionary vector is determined by the count vectorizer 114. In embodiments, an entire dictionary vector is generated for each label to form an entire dictionary matrix. See, for example, FIG. 3D. In embodiments, the number of locations, i.e., dimensions, within each entire dictionary vector is equal to the aggregate number of search values for all the labels.

In one or more embodiments, the count vectorizer 114 replaces each of the search values in the entire dictionary vector, i.e., row, associated with each label with a "1" or a "0". In embodiments, when the location in the entire dictionary vector for a particular label corresponds to a search value that is associated with the particular label, a "1" is placed in that location. In embodiments, when the location in the entire dictionary vector for the particular label corresponds to a search value that is not associated with the particular label, a "0" is placed in that location. For example, in the count vectorizer matrix illustrated in FIG. 3E, in the 28 dimensional vector for the label "infrastructure", a "1" is placed in the $11^{th}$, $12^{th}$, and $13^{th}$ locations. The $11^{th}$, $12^{th}$ and $13^{th}$ locations correspond to the search values "infrastructure", "infra", and "infrastructur", and each of these search values is associated with the label "infrastructure". A "0" is placed in each of the other locations in the 28 dimensional vector for the label "infrastructure" as each of the other locations correspond to search values that are not associated with the label "infrastructure".

In one or more embodiments, the count vectorizer 114 converts the entire dictionary vector for each of the labels into a numerical vector representing each of the search values for the respective labels in the vectors. The result of processing the entire dictionary matrix by the count vectorizer 114 is a matrix where the rows correspond to labels in the expanded training dictionary 122, the columns correspond to the search values in the expanded training dictionary 122, and the "1" or "0" in each location identifies whether or not the search value corresponding to that location is associated with the respective label. In embodiments, the resulting matrix is a sparse matrix as most labels contain only a subset of the search values. The matrix represents the search values in a numerical format suitable for further processing by the machine learning models 112.

In one or more embodiments, the tf-idf transformer 116 is a machine learning algorithm used to calculate the term frequency-inverse document frequency (tf-idf) value for each of the search values in the expanded training dictionary 122. The tf-idf values are used to measure the importance of a search value in a label relative to the importance of the same search value in other labels. In embodiments, tf is a numerical representation of a search value in a label, and idf is a numerical representation of the search value in all the labels. Methods for calculating tf values and idf values and for combining the values vary. In embodiments, the particular method used to calculate the tf values and idf values for the search values and for combining the values is not important as long as the same method is applied consistently to all of the search values. For example, the combined tf-idf value may be represented as tf*idf or tf/idf. In one or more embodiments the tf is used for normalization. In other embodiments, the logarithm of the idf value is used for normalization. In embodiments, the aim of calculating the tf-idf value is to transform the "1's" in the search value vectors into decimals, without losing the context of the data.

In one or more embodiments, the tf-idf transformer 116 operates by calculating the term frequency (tf) value for each search value in a label. In embodiments, the tf value for a search value is the number of times the search value appears in the set of search values associated with the label. In some embodiments, this number is divided by the number of search values within the set of search values associated with the label. In embodiments, the tf-idf transformer 116 calculates the inverse document frequency (idf) value for each search value within the vector for the label. In some embodiments, the idf value for a search value is the number of labels that contain the search value over the number of labels in the document. The idf value for a search value may be the logarithm of the number of labels in the document over the number of labels that contain the search value.

In one or more embodiments, the K-Nearest Neighbors (KNN) algorithm 118 of the machine learning models 112 is a supervised machine learning algorithm that identifies the K closest, i.e., most similar, search value vector to a target vector. In embodiments, the KNN algorithm 118 predicts a label for a target search value by taking the target vector created for the target search value and comparing the target vector to the search value vectors associated with each of the labels. In embodiments, each label is represented as a vector in a multidimensional space, where each search value represents a dimension. In some embodiments, the KNN algorithm 118 compares the target search vector 130 to the search value vectors for the label by plotting the target search vector 130 relative to the search value vectors and identifies the closest search value vector to the target vector. In embodiments, the KNN algorithm 118 measures the distance (similarity) between the target search vector 130 and each of the search value vectors using a distance metric (e.g., Euclidean or Manhattan). In embodiments, the KNN algorithm 118 identifies the closest search value vector (neighbor) to the target search vector 130 based on the calculated distances.

In one or more embodiments, the target search vector 130 and the search value vector for the label determined to be the closest neighbor must have a similarity score within a threshold to be considered the closest match. In some embodiments, the threshold is 99.6 percent. In embodiments, when no search value vector is within the threshold score, the KNN algorithm 118 indicates that no search value vector was close enough to be considered a match to the target search vector.

In one or more embodiments, the search engine 102 generates an enhanced search query 132 using the label associated with the closest search value vector to the target search vector, also referred to as the target label, as a search term. In one or more embodiments, the enhanced search query 132 is generated in the query language used by the documentation repository 108. For example, an enhanced search query for a Confluence database is generated in Confluence Query Language (CQL). In embodiments, a landing page ID may also be provided as a search term.

In one or more embodiments, a data repository 104 is any type of storage unit and/or device (e.g., a file system, database, collection of tables, or any other storage mechanism) for storing data. Further, a data repository 104 may include multiple different storage units and/or devices. The multiple different storage units and/or devices may or may not be of the same type or located at the same physical site. Further, the data repository 104 may be implemented or executed on the same computing system as the search engine 102. Alternatively, or in addition, a data repository 104 may be implemented or executed on a computing system separate from the search engine 102. The data repository 104 may be communicatively coupled to the search engine 102 and the user interface 106 via a direct connection or via a network.

Information describing the search engine 102 may be implemented across any of components within the system 100. However, this information is illustrated within the data repository 104 for purposes of clarity and explanation.

In one or more embodiments, the data repository 104 includes the training dictionary 120, the expanded training dictionary 122, the dictionary of stop words 124, a plurality of vector matrices 126, one or more target search values 128, target search vectors 130, enhanced search queries 132, a search log 134, and feedback 136.

In one or more embodiments, and as noted above, the training dictionary 120 is an index of key value pairs including labels and a set of one or more possible search values associated with each label. The possible search values may include special characters, capitalized letters, and/or stop words. In embodiments, the training dictionary 120 is a text file. The training dictionary 120 may be a user prepared document. In some embodiments, the training dictionary 120 is prepared using one or more machine learning models. The training dictionary 120 may be in a JSON format.

In one or more embodiments, the expanded training dictionary 122 is the training dictionary 120 subsequent to preprocessing. As described in detail above, preprocessing may include one or more of (a) deleting duplicate words within each set of search values, (b) converting the search values to lowercase, (c) cleaning up special characters from the search values, (d) removing stop words from the possible search values, (e) lemmatizing the search values and/or (f) stemming the search values.

In one or more embodiments, the dictionary of stop words 124 is a document containing words considered to be of little value in terms of conveying meaningful information. Stop words may be filtered out to improve the efficiency and effectiveness of the machine learning models 112. Stop words are common words that appear frequently across different documents or texts, and may not carry significant semantic meaning on their own. Examples of stop words in English include words like "the", "and", "is", "of", "in", "to", "it", and "that". In some embodiments, the dictionary of stop words 124 is user created. The dictionary of stop words 124 may include custom stop words particular to an application or use.

In one or more embodiments, the vector matrices 126 include the entire dictionary matrix generated from the aggregate of the search values associated with each of the labels, the count vectorizer matrix generated by the count vectorizer 114 from the entire dictionary matrix, and the updated matrix generated by replacing the "1's" in the count vectorize matrix with the tf-idf values corresponding to the search values in the identified locations.

In one or more embodiments, the target search values 128 correspond to the user entered keywords. The target search values 128 may include one or more search values. The user entered keywords may undergo preprocessing to at least one of remove stop words or address special characters.

In one or more embodiments, the target search vectors 130 are search vectors generated from the one or more target search values 128. The same one or more processes that were performed on the one or more search values associated with the labels may be performed on the one or more target search values 128 to generate the target search vectors 130.

In one or more embodiments, the enhanced search queries 132 are the queries generated by the search engine 102 and provided by the search engine 102 to the search operation of the documentation repository 108 to assist the search for relevant documents in the documentation repository 108. The enhanced search query 132 may be prepared in the query language used by the documentation repository 108. For example, a search query provided to a Confluence search operation is in Confluence Query Language (CQL). In embodiments, the enhanced search query 132 identifies one or more of the target label identified by the search engine 102 or a landing page ID identified for the label predicted by the search engine 102 using the machine learning models 112. By providing the target label as the first search criteria in the enhance search query 132, the results of the search should include the most relevant document first. When the search engine 102 is unable to identify a target label or a landing page ID, the enhanced search query 132 includes the target search values 128 in place of the target label and landing page ID. The enhanced search query 132 may also include the target search values 128.

In one or more embodiments, the search log 134 in the data repository 104 is a log of user searches performed using the search engine 102. The log may include a plurality of fields for each search performed by the search engine 102. The fields may include a timestamp, a user ID, a user keyword search, a machine learning model identified label (target label), a machine learning model keyphrase, a machine learning model identified page ID, an enhanced search query, and/or the number of results returned by the search.

In one or more embodiments, the feedback 136 includes input, opinions, comments, and suggestions provided by users of the search engine 102. Feedback may be provided by the user through surveys, feedback forms, comments, and email. Feedback may be related to (a) the number of search results generated by the search, (b) the relevancy of the search result, (c) the length of time the search engine required to generate the target label, e.g., latency, (d) the presentation of the search results, and/or (e) the inability to predict a target label for a particular search term. In some embodiments, the feedback may be with regards to (a) the overall operation and performance of the search engine 102, (b) individual searches performed by the search engine 102, and/or (c) a particular result within a specific search query. For example, a user may identify one or more search results for a specific search query as being irrelevant, or the user may express frustration at the length of time required to return search results, or frustration at the number of results returned by the search query—too many or too few.

In one or more embodiments, the feedback 136 is used when considered if and how to retrain the machine learning models 112. For example, the training dictionary 122 may be updated to include a search value for one or more labels that was not previously used, or the threshold for determining similarity of the closest search value vector may be adjusted. In some embodiments, one or more of the processes performed by the machining learning models are added or taken away. In some embodiments, the preprocessing techniques are adjusted to be more inclusive or less inclusive.

In one or more embodiments, the data repository 104 includes the dictionary of stop words 124. The dictionary of stop words 124 includes common words that are considered to be of little value in terms of conveying meaningful information. The dictionary of stop words 124 may be used to filter the user provided search query to improve the efficiency and effectiveness of the machine learning models 112. Stop words are common words that appear frequently across different documents or texts, and may not carry significant semantic meaning on their own. Examples of stop words in English include words like "the," "and," "is," "of," "in," "to," "it," and "that." A dictionary of stop words 124 may be maintained in the data repository 104 for use by the search engine 102.

In one or more embodiments, the user interface 106 refers to hardware and/or software configured to facilitate communications between a user and search engine 102. The user interface 106 renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of user interface 106 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, user interface 106 is specified in one or more other languages, such as Java, C, or C++.

In one or more embodiments, the documentation repository 108 is a centralized location or platform where an organization stores, organizes, and manages its documentation, knowledge, and information. The documentation repository 108 may be a digital repository for various types of documents, resources, and content that are important for the operation, processes, projects, and learning within the organization. Examples of documentation repositories include, Confluence, GitHub, GitLab, SharePoint, Read the Docs, and Wiki Systems. Each documentation repository 108 may have its own method and processes for sorting and storing the database of documents and maintain its own collection of metadata tags and labels for facilitating searching of the documents.

In one or more embodiments, the documentation repository 108 includes a plurality of documents or pages 138. Each document 138 may include a label or tag 140 corresponding to the content of the document 138. The documentation repository 108 includes a search operation that takes a simple keyword search query and compares the keyword to an index of keywords to identify a heuristic or string level match. From the match, documents 138 within the documentation repository 108 are identified. The documentation repositories 108 use a query language to filter an index of metadata corresponding to the documents 138 within the documentation repository 108 in response to user keyword searches. For example, Confluence uses the Confluence Query Language (CQL) for users to search content within a Confluence database. Query languages generally allow users to search for content by title, space, author, date, and other criteria. The search results returned using the search operations of the documentation repositories are not always relevant. Additionally, the time to perform the search, i.e., latency, may be excessive.

In one or more embodiments, the documentation repository 108 is a component of a collaborative environment. A collaborative environment is a web-based setting where individuals or groups work together to achieve common goals, share information, exchange ideas, and collectively contribute to projects, tasks, or activities. Examples of collaborative environments include tools like Google Workspace (formerly G Suite), Microsoft Teams, Slack, and Atlassian Stack.

Although reference is made to documents, the search engine 102 may be applied to any collection in which each item in the collection includes a label 140 and one or more search values is associated with each label 140. The label 140 for each page may be provided by a user or the organization responsible for the collection. Each of the documents 138 may include a page ID, e.g., landing page ID, that is associated with the label for the document 138. The page ID may be used in addition to, or instead of the label 140, to enhance a search query.

3. Generating an Enhanced Search Query

Figure 2A:
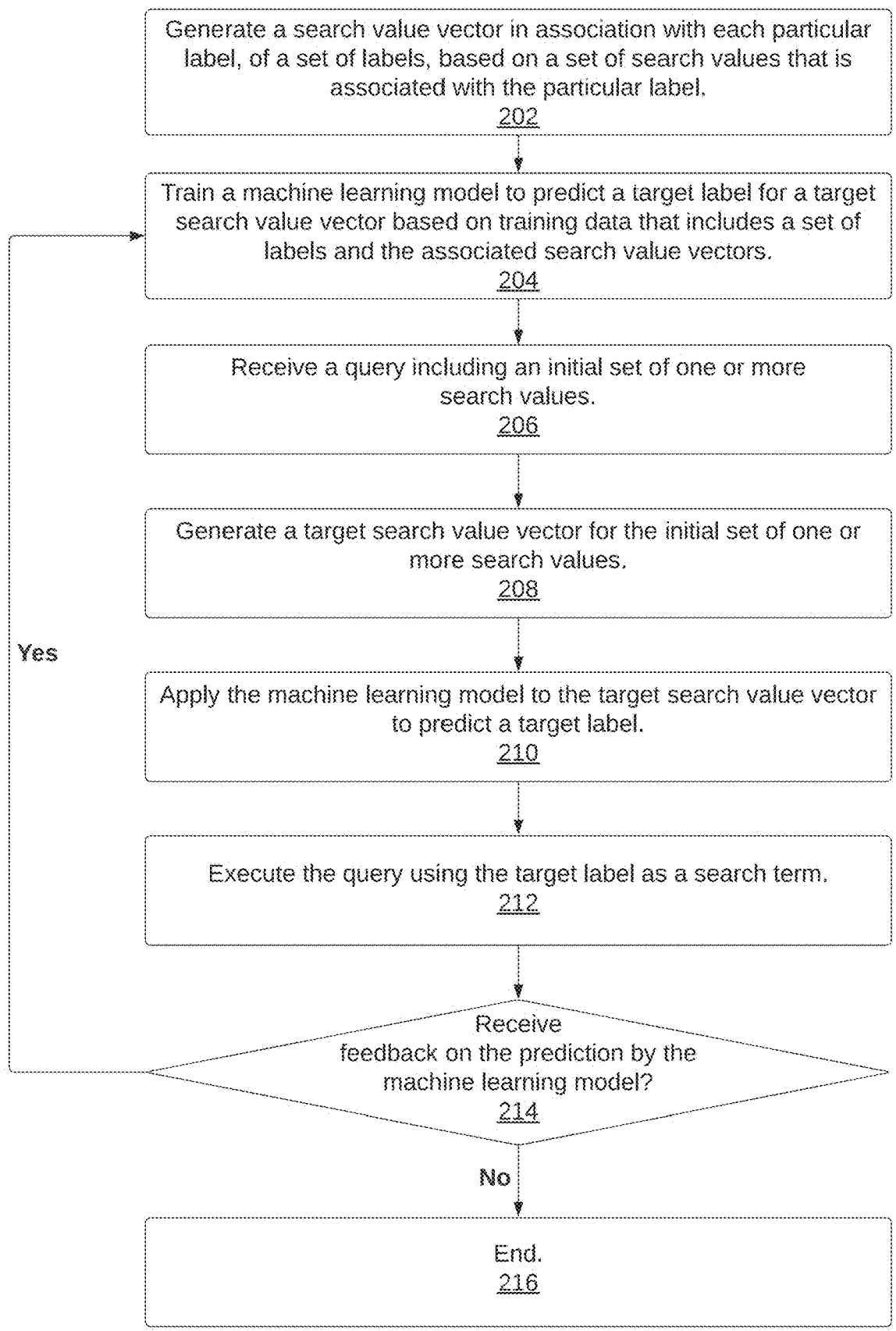
FIG. 2A illustrates an example set of operations for generating an enhanced search query in accordance with one or more embodiments.

FIG. 2A illustrates an example set of operations for predicting and using a target label as a query term for an enhanced search query in accordance with one or more embodiments. One or more operations illustrated in FIG. 2A may be modified, rearranged, or omitted all together. Accordingly, the particular sequence of operations illustrated in FIG. 2A should not be construed as limiting the scope of one or more embodiments.

One or more embodiments generate a search value vector in association with each particular label, of a set of labels, based on a set of search values that is associated with the particular label. (Operation 202). Operations for generating the search value vectors for the set of labels, respectively, are described below with reference to FIG. 2B.

One or more embodiments train a machine learning model to predict a target label for a target search value vector based on training data that includes a set of labels and the associated search value vectors. (Operation 204). The system may choose a suitable supervised learning algorithm based on the characteristics of the training data or the labels to be predicted. Common algorithms include linear regression, decision trees, random forests, support vector machines, and neural networks. The system may train the machine learning model splitting the training data into two or three sets: the training set, validation set, and test set. The system uses the training set to train the model. During training, the machine learning model adjusts its internal parameters to minimize the error (difference between predicted and actual labels) using an optimization algorithm. The specific optimization algorithm varies depending on the chosen algorithm. The system uses the validation set to tune the hyperparameters. Hyperparameters are settings that are not learned during training, such as learning rate, regularization strength, number of hidden layers, etc. The system may use the validation set to test different hyperparameter configurations. The system uses the test set to evaluate the model's performance on unseen data. Common evaluation metrics include accuracy, precision, recall, F1-score (for classification tasks), and mean squared error (for regression tasks). Once trained, the system may continuously monitor the model's performance in real-world scenarios. Over time, the model's performance may degrade due to changes in the data distribution. The model may be regularly retrained with updated data to maintain its accuracy. If the model's performance is not satisfactory, the system may revisit the data, feature engineering, algorithm choice, and hyperparameter tuning to improve the results.

One or more embodiments receive a query including an initial or target set of one or more search values. (Operation 206). During an inference phase, a user enters a query into a search engine to initiate a search. The query includes the initial, or target set of one or more search values. The system preprocesses the one or more search values to perform at least one of: (a) remove stop words or (b) address special characters.

One or more embodiments generate a target search value vector for the initial set of one or more search values. (Operation 208). The system may process the initial set of one or more search values in the same manner as the sets of one or more search values in the training data to generate the target search value vector for the initial set of one or more search values. The system takes the one or more search values associated with each of the labels and combines them to generate an entire dictionary vector. A count vectorizer converts the entire dictionary vector into a numerical vector representing the search values for the initial set of one or more search values. The count vectorizer converts the entire dictionary vector into the numerical vector by (a) placing a "1" in each location in the entire dictionary vector that corresponds to a search value that is included in the one or more search values from the initial set of one or more search values, and (b) placing a "0" in each location in the entire dictionary vector that corresponds to a search value that is not included in the one or more search values from the initial set of one or more search values. A tf-idf transformer may calculate an updated value to represent each of the search values. The tf-idf value for the one or more search values replace the "1's" corresponding to the respective one or more search terms to create an updated target search vector.

One or more embodiments apply the machine learning model to the target search value vector to predict a target label. (Operation 210). A KNN algorithm trained on the matrix of search value vectors associated with the labels may be applied to the target search value vector to identify the most similar vector, i.e., nearest neighbor. In some embodiments, the label associated with the search vector identified as the nearest neighbor to the target search vector is the target label for the target set of one or more search values. When the similarity between the search vector identified as the nearest neighbor and the target search value vector is below a threshold, the KNN algorithm returns no match. In some embodiments, the threshold is 99.6%.

One or more embodiments execute the query using the target label as a search term. (Operation 212). The search engine may generate the query for the document database being searched in the query language used by the document database. In embodiments, the label predicted by the machine learning model using the target search value vector, also referred to as the target label, is provided as the primary or first search term. A landing page ID associated with the target label may be provided as the primary or first search term. The one or more search values of the target set of one or more search values may be used as additional search terms in the query generated by the search engine.

One or more embodiments receive feedback on the prediction by the machine learning model. (Operation 214). Feedback may include input, opinions, comments, and suggestions provided by the user. Feedback may be provided by the search engine. Feedback may be related to the number of search results generated by the search, the relevancy of the search result, the length of time required by the search engine to generate the target label, e.g., latency, the presentation of the search results, or the inability of the machine learning models to return a target label for a particular search term. Feedback may be directed to (a) the overall operation and performance of the search engine 102, (b) to individual searches performed by the search engine 102, and/or (c) to a particular result within a specific search query.

In one or more embodiments, feedback 136 is considered when deciding if and how to retrain the machine learning models 112. For example, the training dictionary 122 may be updated to include a search value for one or more labels that was not previously used, or the threshold for determining similarity of the closest search value vector may be adjusted. In some embodiments, one or more of the processes performed by the machining learning models are added or taken away. In some embodiments, the preprocessing techniques are adjusted to be more inclusive or less inclusive.

One or more embodiments end the search operation when no feedback is received. (Operation 216).

4. Generating Search Value Vectors

FIG. 2B illustrates an example set of operations for generating search value vectors associated with each label in accordance with one or more embodiments. One or more operations illustrated in FIG. 2B may be modified, rearranged, or omitted all together. Accordingly, the particular sequence of operations illustrated in FIG. 2B should not be construed as limiting the scope of one or more embodiments.

One or more embodiments preprocess the search values in each set of search values associated with label. (Operation 202a). Each set of search values may be provided in a training dictionary and are each associated with a label. A preprocessor of a search engine performs some processes on the search values individually, and other process on the sets of one or more search values associated with each label. In embodiments, the preprocessor prepares the search values in the training dictionary for use by the one or more machine learning models 112. In some embodiments, the preprocessor generates an expanded training dictionary by (a) deleting duplicate words within each set of search values, (b) converting the possible search values to lowercase, (c) cleaning up special characters from the possible search values, (d) removing stop words from the possible search values, (e) lemmatizing the possible search values and/or (f) stemming the possible search values.

One or more embodiments aggregate the preprocessed sets of search values to generate an entire dictionary vector for each label that includes n search values. (Operation 202b). The one or more search values associated with each of the labels may be combined to generate the entire dictionary vector. An entire dictionary vector is generated for each label. The entire dictionary vectors for the labels may be arranged to form an entire dictionary matrix where each row corresponds to a label and each column corresponds to one of the n search values.

One or more embodiments create a search vector for each set of search values that represents a location of each search value of the set search values within the entire dictionary vector for the label associated with the set of search values. (Operation 202c). A count vectorizer converts the entire dictionary vector for each of the labels into a numerical vector representing each of the search values of the respective labels. The result of processing the entire dictionary matrix by the count vectorizer is a matrix where the rows correspond to the labels in the expanded training dictionary, the columns correspond to the search values in the expanded training dictionary, and each location in the matrix includes a "1" or "0" depending on whether or not the search value corresponding to that location is associated with the respective label. The resulting matrix is a sparse matrix as most labels contain only a subset of the search values. The matrix represents the search values in a numerical format suitable for further processing by the machine learning models.

One or more embodiments determine a numerical representation (e.g., term frequency tf) for each search value within its set of search values by identifying the number of occurrences of each search value within its set of search values. (Operation 202d). In embodiments, the tf value for a search value is the number of times the search value appears in the set of search values associated with the label. In embodiments, a tf-idf transformer calculates the term frequency (tf) value for each search value in a label. In some embodiments, this number is divided by the number of search values within the set of search values associated with the label.

One or more embodiments determine a numerical representation (e.g., inverse document frequency idf) for each search value of the sets of search values based on occurrence(s) of the search value in the entire dictionary vector for each label. (Operation 202e). In some embodiments, the idf value for a search value is the number of labels that contain the search value over the number of labels in the document. The idf value for a search value may be the logarithm of the number of labels in the document over the number of labels that contain the search value. The tf-idf transformer calculates the inverse document frequency (idf) value for each search value within the vector for the label.

One or more embodiments determine a combined numerical representation for each search value by combining the numerical representation for each search value within its set of search values and the numerical representation for occurrence(s) of each search value within the entire dictionary vector for each label. (Operation 202f). Methods for combining the tf and idf values vary. The particular method used to calculate the tf values and idf values for the search values and for combining the values is not important as long as the same method is applied consistently to all of the search values. The combined tf-idf value may be computed by a multiplication operation (tf*idf). In some embodiments, the combined tf-idf value may be computed by a division operation (tf/idf). A system may use the tf value for normalization, or the logarithm of the idf value for normalization. The aim of calculating the tf-idf value is to transform the "1's" in the search value vectors into decimals, without losing the context of the data.

One or more embodiments update the search vector, generated in operation 202c, to incorporate the combined numerical representations, for search values, generated in operation 202f. (Operation 202g). Specifically, the search vectors indicating the locations of the search values for the one or more search values of the respective labels are updated to include the combined numerical representations for each of the one or more search values associated with the particular label. Accordingly, the updated search vectors indicate both the locations of the search values and the combined numerical representations determined for the search values associated with the particular label. As an example, the combined tf-idf values for each of the search terms in each of the labels replaces the "1" corresponding to the search values for the respective label to generate the updated vector for each label.

One or more embodiments graph the updated search vector for each set of search values. (Operation 202h). The system plots the updated search vectors for each set of search values for later use in determining the closest search value vector for a target search vector as described above with relation to operation of the KNN algorithm during the inference phase.

5. Example Training of Machine Learning Model

A detailed example is described below for purposes of clarity. Components and/or operations described below should be understood as one specific example which may not be applicable to certain embodiments. Accordingly, components and/or operations described below should not be construed as limiting the scope of any of the claims.

FIGS. 3A-3G illustrate the training of a machine learning model for predicting a target label for a target search value(s).

FIG. 3A illustrates a user prepared training dictionary. The training dictionary includes a list of tags/labels, and one or more search values corresponding to the tags. As shown, when available, the training dictionary includes a landing page for each label. Although not shown, where available, the training dictionary may further include one or more of: (a) glossary text, (b) glossary link, or (c) glossary slack, for each label.

FIG. 3B illustrates an expanded training document. The expanded training document includes the tags from the training dictionary shown in FIG. 3A and one or more search values corresponding to the tags after preprocessing of the one or more search values. Preprocessing includes one or more of removing stop words, converting search values to lowercase, cleaning up special characters, deleting duplicate words within each set of search values, lemmatizing the search values, or stemming the search values. For some labels, the preprocessing increased the number of search values for the label, e.g., trust-services. For other labels, the preprocessing reduced the number of search values for a label, e.g., nsit.

As seen by comparing FIGS. 3A and 3B, the label "trust-services" went from including a single search value "trust services" prior to preprocessing, to a plurality of search values, including, "trust-services", "trustservices", "trust", "services", "service", "trust-service", "trustservic", and "service" subsequent to preprocessing. In contrast, the label "nsit" went from having a plurality of search values, including, "nsit", "nsit internal", "nsit contact", "nsit landing page", "nsit ops", "nsit confluence", "nsit identity teams", "oraclenetsuite nsit", "netsuite it", "netsuite" prior to preprocessing, to a single search value "nsit" subsequent to preprocessing.

FIG. 3C is a raw text matrix of the expanded training document shown in FIG. 3B. The sets of one or more search values associated with each label form a vector with a dimension equal to the number of search values. For example, the label "nsit" forms a one-dimensional vector and the label "cloud-ops" forms a nine-dimensional vector. As will become evident below, the search values "ops" and "op" appear in both the label "cloud-ops" and the label "jira".

FIG. 3D is the entire dictionary matrix, i.e., formed from all the search values corresponding to each of the labels from the raw text matrix. As shown, the entire dictionary matrix includes an entire dictionary vector for each label from the raw text matrix. Although the search values in the vector are shown arranged in an order corresponding to the order that the search values appear in in the labels, the search values may be arranged in any manner, and the order persists in the other vectors in the matrix. The raw text matrix includes 28 search values, thereby forming a 28 dimensional vector.

FIG. 3E is a count vectorizer matrix, i.e., a numerical representation of the search values in the entire dictionary matrix generated using a count vectorizer. Each row in the count vectorizer matrix represents a label and each location within a row corresponds to a search value from the entire dictionary vector. As noted above, the order of the search values may be different than shown, and persists throughout the vectors, e.g., rows.

As illustrated in FIG. 3E, the second row, corresponding to the label "infrastructure", includes a "1" at each of the $11^{th}$, $12^{th}$, and $13^{th}$ locations in the row. These location correspond to the search values "infrastructure", "infra" and "infrastructur", respectively, i.e., the search values associated with the label "infrastructure". The second row includes a "0" at each of the $1^{st}$ to $10^{th}$ locations and at the $14^{th}$ to $28^{th}$ locations in the row as each of these locations corresponds to a search value that is not associated with the label "infrastructure". In contrast, the fifth row, corresponding to the label "jira", includes a "1" at each of the $5^{th}$, $10^{th}$, and $23^{rd}$ to $28^{th}$ locations in the row. These locations correspond to the search values "jira", "access", "ops", "new", "project", and "op", respectively, i.e., the search values associated with the label "jira". The "1" in each of the $5^{th}$ and $25^{th}$ location in the row correspond to the search value "ops", and the "1" in the $10^{th}$ and $28^{th}$ location in the row correspond to the search value "op". The "0" in each of the other locations in the fifth row indicate that the search value corresponding to the location is not included in the search values associated with the label "jira".

FIG. 3F is a chart identifying the tf and idf values for each of the search values in the entire dictionary matrix. As noted above, there are a variety of ways of calculating individual tf and idf values and for combining, or not combining, the values to form a tf-idf value. The tf value is a numerical representation of the frequency of a search value within a label, and the idf value is a numerical representation of the frequency of a search value within the document.

As shown, the tf values are calculated by counting the number of times a search value appears in the search values of a label, over the number of search values in the label. For example, search value "cloud-ops" appears once in the search values for the label "cloud-ops", and there are ten (10) search values associated with the label "cloud-ops". Thus, the tf value for the search value "cloud-ops" is $\frac{1}{10}$. Similarly, the search value "trust" appears once in the search values for the label "trust-services", and there are eight (8) search values associated with the label "trust", resulting in a tf value of ⅛.

As shown, the idf values are calculated by counting the number of labels, e.g., rows, that a search value appears in, over the total number of labels in the matrix. For example, the search value "nsit" appears in the search values of a single label, "nsit", and there are a total of five (5) labels. Thus, the idf value for the search value "nsit" is ⅕. In contrast, the search value "ops" appears in the search values of two labels, i.e., the rows corresponding to the labels for "cloud-ops" and "jira", and there are a total of five (5) labels. Thus, the idf value for the search value "ops" is ⅖.

The tf and idf values may be combined in a variety of ways to produce a numerical representation of the relevance of a search value within a label to all the labels. The combined tf-idf value is a decimal number between "0" and "1". The combined tf-idf value may be calculated by multiplying the tf value by the idf value or by dividing the tf value by the idf value.

FIG. 3G is an updated matrix of the search values. As shown, each of the locations in the matrix that included a "1", as being indicative of the presences of a search value corresponding to the location being associated with the label for the row is replaced by the combined tf-idf value for the search value corresponding to the particular location.

6. Example Use of Trained Machine Learning Model

A detailed example is described below for purposes of clarity. Components and/or operations described below should be understood as one specific example which may not be applicable to certain embodiments. Accordingly, components and/or operations described below should not be construed as limiting the scope of any of the claims.

FIG. 4 illustrates the operations for predicting a target label for a target search value using the trained machine learning model of FIGS. 3A-3G. As shown, "oper" is the target search value. The target search value may undergo preprocessing. Preprocessing may remove stop words and/or address special characters.

One or more embodiments includes applying the count vectorizer to the entire dictionary vector for the search value "oper" to generate a count vectorizer vector for the search value "oper". As shown, the resulting vector includes a "1" in the $9^{th}$ location of the entire dictionary vector, indicating that the search value "oper" corresponds to that location. A "0" is in each of the $1^{st}$ to $8^{th}$ and $10^{th}$ to $28^{th}$ locations in the entire dictionary vector, indicating that the search value "oper" does not correspond to any of those locations.

One or more embodiments includes applying the tf-idf transformer to the search value "oper" to determine a tf-idf value. The search value "oper" is one (1) of one (1) search value, resulting in a tf value of 1/1. The search value "oper" appears in one (1) search vector corresponding to one (1) label of the five (5) search vectors corresponding to the five (5) labels, resulting in an idf value of ⅕. The tf-idf value is 0.2.

One or more embodiments includes replacing the "1" in the $9^{th}$ location of the count vectorizer vector with the tf-idf value to generate a target search vector. The target search vector is updated for comparing with the updated matrix illustrated in FIG. 3G.

In one or more embodiments, the target search vector is compared to the search vectors in the updated matrix to predict a target label. In embodiments, the 28-dimension target search vector is plotted relative to the 28-dimension search vectors in the updated matrix to identify the closest search vector to the target search vector. The trained K-Nearest Neighbor algorithm is applied to target search vector to determine the search vector that is the nearest neighbor to the target search value. The Euclidean or Manhattan methods may be used to calculate the distance between the target search vector and each of the search vectors in the updated matrix. As shown, the KNN model identified the search vector associated with the label "cloud-ops" as the closest search value vector.

Although described as occurring after the tf-idf transformer is applied to the count vectorizer vector, the closest search vector may be determined using the count vectorizer vector, thereby skipping the tf-idf transformer and reducing the latency in generating the target label.

7. Example Search Log for Trained Machine Learning Model

FIGS. 5A and 5B illustrate a sample search log generated by a search engine in accordance with the above described process. In embodiments, and as shown, the search log is a table with each row representing a search query. In embodiments, each row in the table includes the following fields, Timestamp, User ID, User Keyword, ML Model Identified Label (target label), ML Keyphrase, ML Model Identified Page ID, Confluence CQL String, and No. of Results. In some embodiments, the search log further includes the amount of time taken to generate the ML Model Identified Label, the amount of time taken to perform the search using the Confluence CQL String, and/or the total time to perform both operations. Although shown displaying four searches, the search log is configurable to display any number of searches. The search log may display a particular number of most recent searches, or searches that occurred within a particular time period, e.g., last 30, 60 or 90 days. The entries may be sorted in any manner, including chronologically using the Timestamp and/or by any one or more of the other fields. Although shown and described as related to a search log generated for a search query of a Confluence database, the search engine may be employed to work with any document database and generate a corresponding search log.

In one or more embodiments, the Timestamp includes the date and time associated with the search identified in the row. The time may refer to when the search query was entered by the user, when the search engine completed identifying the ML Model Identified Label, and/or when the search engine executed the search using the target label.

In one or more embodiments, the User ID is a username and/or e-mail address particular to a user. The User ID may be provided by the user prior to accessing the search engine.

In one or more embodiments, the User Keyword is the search query entered by the user. The user keyword may be more than one term.

In one or more embodiments, the ML Model Identified Label is the label identified by the search engine as being the target label for the respective User Keyword. As described in detail above, the target label corresponds to the closest search vector to a target search vector generated for the User Keyword.

In one or more embodiments, the search engine is unable to identify an ML Model Identified Label for a User Keyword, e.g., rugby. More particularly, there is no search value vector similar enough to the target search vector, i.e., within a similarity score within specified threshold. In some embodiments, the threshold is 99.6%. When there is no search vector located within the threshold of the target search vector, the entry for the ML Model Identified Label indicates "NO_MATCHES_FOUND".

In one or more embodiments, the ML Keyphrase is a search value comprising one or more words. The ML Keyphrase may be the same as the User Keyword. The ML Keyphrase may be the result of preprocessing the User Keyword. For example, for the User Keyword, "things you should know", preprocessing removed "you" and "should", resulting in a ML Keyphrase of "things know".

In one or more embodiments, the ML Model Identified Page ID is a landing page ID associated with the ML Model Identified Label. Not all labels may include a landing page ID. In embodiments when search engine is unable to provide a ML Model Identified Label, the ML Model Identified Page ID indicates "NO_MATCHES_FOUND".

In one or more embodiments, the Confluence CQL String is a search query string formatted in Confluence Query Language (CQL). In embodiments, and as shown, when available, the ML Model Identified Page ID is provided first. In embodiments, the ML Model Identified Label identified in the "Label" and "Title" fields is provided second. In some embodiments, the User Keyword and the ML Model Identified Label and the ML Keyphrase identified in the "Text" field is provided third. In embodiments where the search engine returned "NO_MATCHES_FOUND" for the ML Model Identified Label, the ML Keyphrase is identified in the "Label" and "Title" fields first, followed by the User Keyword and the ML Keyphrase identified in the "Text" field second.

In one or more embodiments, the No. of Results is the number of results provided by the search operation of the Confluence documentation repository in response to the CQL string provided by the search engine.

8. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 6:
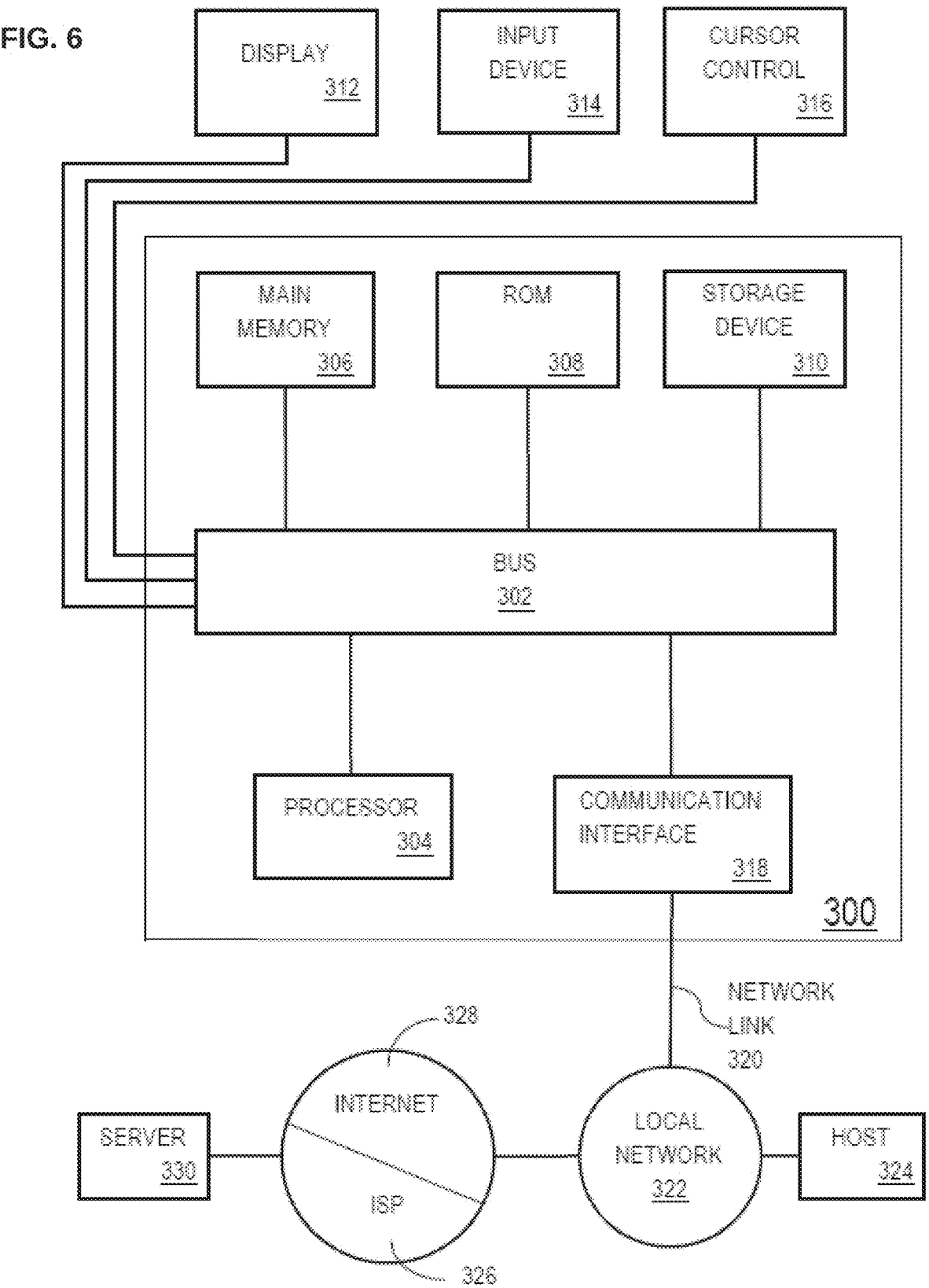
FIG. 6 shows a block diagram that illustrates a computer system in accordance with one or more embodiments.

For example, FIG. 6 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 310. Volatile media includes dynamic memory, such as main memory 306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

9. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, causes performance of operations comprising:
   obtaining (a) a plurality of labels and (b) a plurality of sets of search values, each of the plurality of labels being associated with a respective set of search values from the plurality of sets of search values;
   aggregating the search values in the plurality of the sets of search values to generate a list of n search values;
   generating a plurality of search value vectors for the plurality of labels, respectively, at least by:
      for each particular label of the plurality of labels, generating a particular search value vector representing information for one or more particular search values in a particular set of search values associated with the particular label, wherein the information for the one or more particular search values comprises one or more of:
         (a) locations of the one or more particular search values within the list of n search values,
         (b) a term frequency (tf) of the one or more particular search values in the particular set of search values, or
         (c) an inverse document frequency (idf) of the one or more particular search values in the list of n search values;
   generating training data, for training a machine learning model, based on the plurality of labels and the plurality of search value vectors;
   training the machine learning model to predict labels from vectors using the training data;
   receiving a query comprising a target set of one or more target search values;
   computing a target search value vector representing information for the target set of one or more target search values, wherein the information for the one or more target search values comprises one or more of:
      (a) locations of the one or more target search values within the list of n search values,
      (b) a term frequency (tf) of the one or more target search values in the target set of search values, or
      (c) an inverse document frequency (idf) of the one or more target search values in the list of n search values;
   applying the machine learning model to the target search value vector to predict a target label for the query; and
   using the target label, as a search term, to execute the query.

2. The non-transitory computer readable medium of claim 1, wherein the particular search value vector has n vector values that are computed based at least in part on the list of n search values, wherein each vector value x, of the n vector values, is determined based on whether or not any of particular set of search values match the x-th value within the list of n values.

3. The non-transitory computer readable medium of claim 1, wherein the operations further comprise:
receiving feedback associated with a prediction by the machine learning model; and retraining the machine learning model based on the feedback.

4. The non-transitory computer readable medium of claim 1, wherein the operations further comprise:
receiving a second query comprising a second target set of one or more target search values;
computing a second target search value vector representing information for the one or more target search values of the second target set, wherein the information for the one or more target search values of the second target set comprises one or more of:
(a) locations of the one or more target search values of the second target set within the list of n search values,
(b) a term frequency (tf) of the one or more target search values of the second target set in the target set of search values of the second target set, or
(c) an inverse document frequency (idf) of the one or more target search values of the second target set in the list of n search values;
applying the machine learning model to the second target search value vector to predict a target label for the second query, wherein the machine learning model returns no target label for the second query; and
using the one or more target search values of the second target set as a search term to execute the second query.

5. The non-transitory computer readable medium of claim 1, wherein the operations further comprise:
preprocessing the search values, wherein preprocessing the search values comprises one or more of:
(a) removing stop words,
(b) converting search values to lowercase,
(c) cleaning up special characters,
(d) deleting duplicate words within each set of search values,
(e) lemmatizing the search values, or
(f) stemming the search values.

6. The non-transitory computer readable medium of claim 1, wherein obtaining the plurality of labels and the plurality of sets of search values includes receiving a user prepared document, the user prepared document including the plurality of labels and the plurality of sets of search values.

7. The non-transitory computer readable medium of claim 1, wherein obtaining the plurality of labels and the plurality of search values further includes obtaining a landing page ID for each of the plurality of labels, wherein applying the machine learning model to the target search value vector to predict a target label for the query further includes providing a landing page ID for the target label.

8. The non-transitory computer readable medium of claim 1, wherein applying the machine learning model to the target search value vector to predict a target label for the query comprises:
using a K-Nearest Neighbor (KNN) model to determine a closest match to the target search value vector.

9. A method comprising:
obtaining (a) a plurality of labels and (b) a plurality of sets of search values, each of the plurality of labels being associated with a respective set of search values from the plurality of sets of search values;
aggregating the search values in the plurality of the sets of search values to generate a list of n search values;
generating a plurality of search value vectors for the plurality of labels, respectively, at least by:
for each particular label of the plurality of labels, generating a particular search value vector representing information for one or more particular search values in a particular set of search values associated with the particular label, wherein the information for the one or more particular search values comprises one or more of:
(a) locations of the one or more particular search values within the list of n search values,
(b) a term frequency (tf) of the one or more particular search values in the particular set of search values, or
(c) an inverse document frequency (idf) of the one or more particular search values in the list of n search values;
generating training data, for training a machine learning model, based on the plurality of labels and the plurality of search value vectors;
training the machine learning model to predict labels from vectors using the training data;
receiving a query comprising a target set of one or more target search values;
computing a target search value vector representing information for the target set of one or more target search values, wherein the information for the one or more target search values comprises one or more of:
(a) locations of the one or more target search values within the list of n search values,
(b) a term frequency (tf) of the one or more target search values in the target set of search values, or
(c) an inverse document frequency (idf) of the one or more target search values in the list of n search values;
applying the machine learning model to the target search value vector to predict a target label for the query; and
using the target label, as a search term, to execute the query.

10. The method of claim 9, wherein the particular search value vector has n vector values that are computed based at least in part on the list of n search values, wherein each vector value x, of the n vector values, is determined based on whether or not any of particular set of search values match the x-th value within the list of n values.

11. The method of claim 9, further comprising:
receiving feedback associated with a prediction by the machine learning model; and retraining the machine learning model based on the feedback.

12. The method of claim 9, further comprising:
receiving a second query comprising a second target set of one or more target search values;
computing a second target search value vector representing information for the one or more target search values of the second target set, wherein the information for the one or more target search values of the second target set comprises one or more of:
(a) locations of the one or more target search values of the second target set within the list of n search values, (b) a term frequency (tf) of the one or more target search values of the second target set in the target set of search values of the second target set, or (c) an inverse document frequency (idf) of the one or more target search values of the second target set in the list of n search values;

applying the machine learning model to the second target search value vector to predict a target label for the second query, wherein the machine learning model returns no target label for the second query; and using the one or more target search values of the second target set as a search term to execute the second query.

13. The method of claim 9, further comprising:
preprocessing the search values, wherein preprocessing the search values comprises one or more of:
(a) removing stop words,
(b) converting search values to lowercase,
(c) cleaning up special characters,
(d) deleting duplicate words within each set of search values,
(e) lemmatizing the search values, or
(f) stemming the search values.

14. The method of claim 9, wherein obtaining the plurality of labels and the plurality of sets of search values includes receiving a user prepared document, the user prepared document including the plurality of labels and the plurality of sets of search values.

15. The method of claim 9, wherein obtaining the plurality of labels and the plurality of search values further includes obtaining a landing page ID for each of the plurality of labels, wherein applying the machine learning model to the target search value vector to predict a target label for the query further includes providing a landing page ID for the target label.

16. The method of claim 9, wherein applying the machine learning model to the target search value vector to predict a target label for the query comprises:
using a K-Nearest Neighbor (KNN) model to determine a closest match to the target search value vector.

17. A system comprising:
one or more processors; and
memory storing instructions that, when executed by the one or more processors, cause the system to perform:
obtaining (a) a plurality of labels and (b) a plurality of sets of search values, each of the plurality of labels being associated with a respective set of search values from the plurality of sets of search values;
aggregating the search values in the plurality of the sets of search values to generate a list of n search values;
generating a plurality of search value vectors for the plurality of labels, respectively, at least by:
for each particular label of the plurality of labels, generating a particular search value vector representing information for one or more particular search values in a particular set of search values associated with the particular label, wherein the information for the one or more particular search values comprises one or more of:
(a) locations of the one or more particular search values within the list of n search values,
(b) a term frequency (tf) of the one or more particular search values in the particular set of search values, or
(c) an inverse document frequency (idf) of the one or more particular search values in the list of n search values;

generating training data, for training a machine learning model, based on the plurality of labels and the plurality of search value vectors;
training the machine learning model to predict labels from vectors using the training data;
receiving a query comprising a target set of one or more target search values;
computing a target search value vector representing information for the target set of one or more target search values, wherein the information for the one or more target search values comprises one or more of:
(a) locations of the one or more target search values within the list of n search values,
(b) a term frequency (tf) of the one or more target search values in the target set of search values, or
(c) an inverse document frequency (idf) of the one or more target search values in the list of n search values;
applying the machine learning model to the target search value vector to predict a target label for the query; and
using the target label, as a search term, to execute the query.

18. The system of claim 17, wherein the particular search value vector has n vector values that are computed based at least in part on the list of n search values, wherein each vector value x, of the n vector values, is determined based on whether or not any of particular set of search values match the x-th value within the list of n values.

19. The system of claim 17, wherein the instructions cause the system to further perform:
receiving feedback associated with a prediction by the machine learning model; and retraining the machine learning model based on the feedback.

20. The system of claim 17, wherein the instructions cause the system to further perform:
receiving a second query comprising a second target set of one or more target search values;
computing a second target search value vector representing information for the one or more target search values of the second target set, wherein the information for the one or more target search values of the second target set comprises one or more of:
(a) locations of the one or more target search values of the second target set within the list of n search values,
(b) a term frequency (tf) of the one or more target search values of the second target set in the target set of search values of the second target set, or
(c) an inverse document frequency (idf) of the one or more target search values of the second target set in the list of n search values;
applying the machine learning model to the second target search value vector to predict a target label for the second query, wherein the machine learning model returns no target label for the second query; and
using the one or more target search values of the second target set as a search term to execute the second query.

21. The system of claim 17, wherein the instructions cause the system to further perform:
preprocessing the search values, wherein preprocessing the search values comprises one or more of:
(a) removing stop words,
(b) converting search values to lowercase, (c) cleaning up special characters,
(d) deleting duplicate words within each set of search values,
(e) lemmatizing the search values, or
(f) stemming the search values.

22. The system of claim 17, wherein obtaining the plurality of labels and the plurality of sets of search values includes receiving a user prepared document, the user prepared document including the plurality of labels and the plurality of sets of search values.

23. The system of claim 17, wherein obtaining the plurality of labels and the plurality of search values further includes obtaining a landing page ID for each of the plurality of labels, wherein applying the machine learning model to the target search value vector to predict a target label for the query further includes providing a landing page ID for the target label.

24. The system of claim 17, wherein applying the machine learning model to the target search value vector to predict a target label for the query comprises:
 using a K-Nearest Neighbor (KNN) model to determine a closest match to the target search value vector.

* * * * *